United States Patent [19]

Kim et al.

[11] Patent Number: 5,472,993
[45] Date of Patent: Dec. 5, 1995

[54] ANTI-FOULING PAINT

[75] Inventors: Bum S. Kim, Seoul; Chang K. Seo; Chang J. You, both of Soowon City, all of Rep. of Korea

[73] Assignee: Korea Chemical Co., Ltd., Kyeongsangnam, Rep. of Korea

[21] Appl. No.: 366,549

[22] Filed: Dec. 30, 1994

[51] Int. Cl.$^6$ .............................. C08F 30/08; C08K 3/18; C08K 3/22
[52] U.S. Cl. .................. 523/122; 524/431; 524/432; 526/240; 526/257
[58] Field of Search ............................ 523/122; 524/431, 524/432; 525/364; 526/240, 297, 257

[56] References Cited

U.S. PATENT DOCUMENTS

| | | | |
|---|---|---|---|
| 4,408,012 | 10/1983 | Furuya et al. | 525/161 |
| 4,436,886 | 3/1984 | Tsai et al. | 526/257 |
| 5,332,430 | 7/1994 | Geriok et al. | 106/18.33 |

*Primary Examiner*—Paul R. Michl
*Assistant Examiner*—La Vonda R. DeWitt
*Attorney, Agent, or Firm*—Watson, Cole, Grindle & Watson

[57] ABSTRACT

An anti-fouling paint using self-polishing copolymer which contains n-[(N-isothiazolonyl)-alkyl] acrylate as one of the monomers has improved anti-fouling property and can reduce environmental hazard by reduction of the leaching amount of biocide like organotin and of additional biocide like copper compound. The paint can control the rate of dissolution and prolong the effectiveness of the paint.

5 Claims, 1 Drawing Sheet

FIG.1A
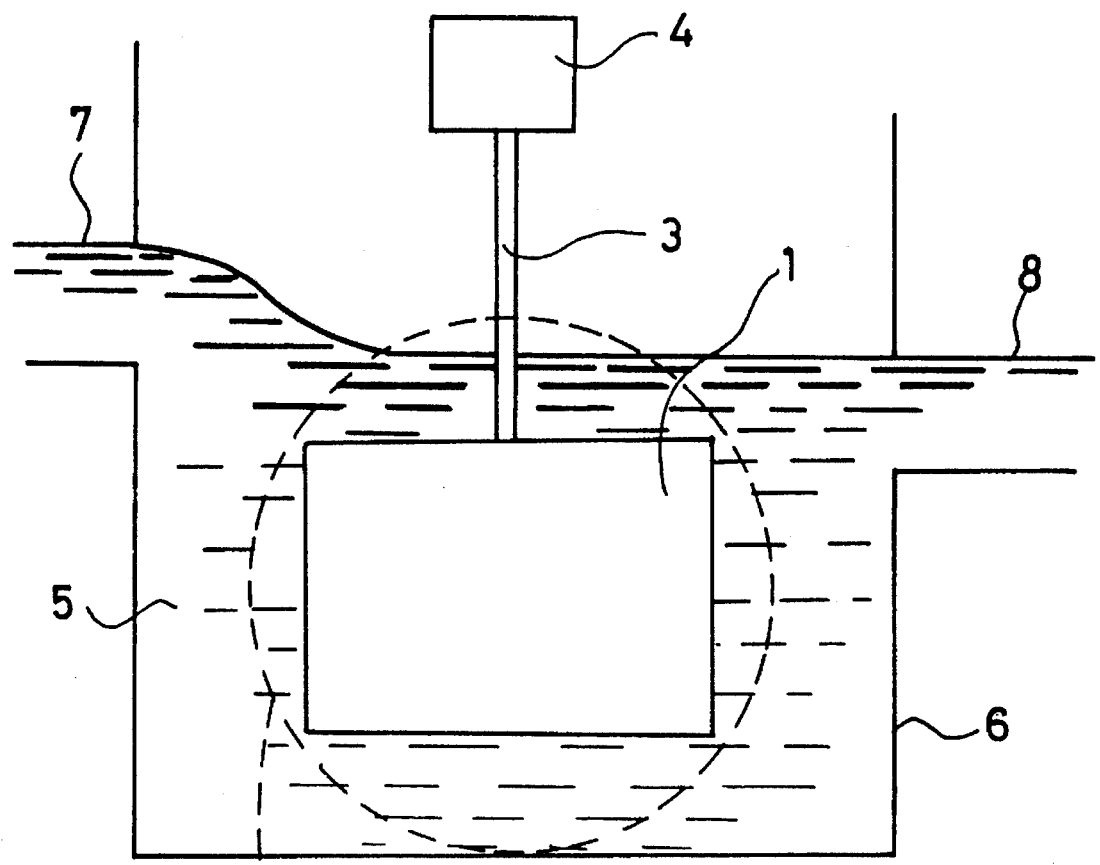
SEE FIG.1B
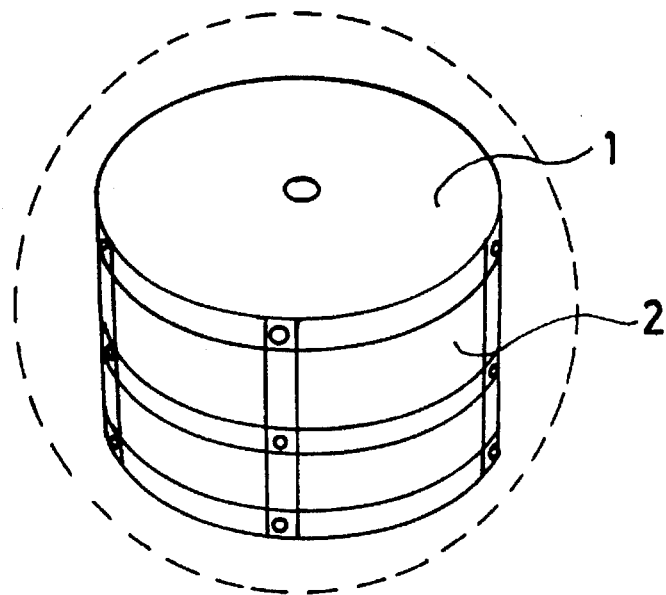
FIG.1B

ANTI-FOULING PAINT

BACKGROUND OF INVENTION

The present invention relates to an anti-fouling paint generally used for top-coat exposed to a marine environment. These anti-fouling paints prevent settlement and growth of such marine organisms as barnacles, algae and others.

Anti-fouling coating is intended to control or prevent attachment and growth of fouling organisms on surfaces immersed in sea-water. The growth of these organisms on submerged surfaces can lead to dramatic rise in fuel costs. The build-up of fouling increases the frictional resistance of the hull and drag effects, which means that a ship must use up considerably more fuel due to its increased weight and reduced speed.

One of the successful anti-fouling paints developed in recent years is the anti-fouling paint using self-polishing copolymer. U.S. Pat. No. 3,167,473 and British Patent No. 1,457,590 disclose the self-polishing copolymers formed of triorganotin salt of an olefinically unsaturated carboxylic acid and at least one olefinically unsaturated comonomer, into which other biocides/pigments are incorporated. The copolymer proves some biocidal action of the paints and hydrolyzes in sea water at a constant leaching rate.

Generally, the antifouling paint composition contains pigments and biocides such as copper, zinc, or titanium compounds to prevent attachment of marine organisms. When larger amounts of pigments and biocides are added, the erosion rate and the effectiveness of anti-fouling increase. But the anti-fouling paints pose serious environmental and health hazards by releasing tributyltin and biocides.

SUMMARY OF INVENTION

This invention relates to an anti-fouling paint using a self-polishing copolymer which contains n-[(N-isothiazolonyl)-alkly] acrylates as a monomer. The general structure of n-[(N-isothiazolonyl)alkyl] acrylate is as shown below (formula I):

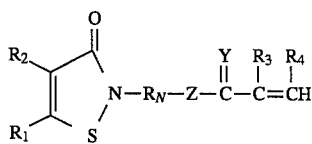
(I)

wherein $R_1$ and $R_2$ are independently H, halogen, alkyl group of $C_1$ to $C_5$ or alkyl group of $C_1$ to $C_5$ substituted by halogen; $R_N$ is substituted or unsubstituted alkyl, or alkenyl group of $C_1$ to $C_{18}$; Z is NH, O or S; Y is O or S; $R_3$ and $R_4$ are independently H, halogen, alkyl group of $C_1$ to $C_5$, or alkyl group of $C_1$ to $C_5$ substituted by halogen.

In one embodiment of the present invention the antifouling paint comprises the self-polishing copolymer which is prepared by reacting n-[(N-isothiazolonyl)-alkyl] acrylate, triorganotin compound, and at least one olefinically unsaturated comonomer. The effective amount of n-[(N-isothiazolonyl)-alkyl] acrylate ranges from 1 to 30 percent by weight of the total monomer units.

This antifouling paint has an improved anti-fouling property and can reduce the amount of leaching of biocide like triorganotin because the copolymer contains n-[(N-isothiazolonyl)-alkyl] acrylate which acts as biocides in polymer backbone. The copolymer can control the rate of dissolution and prolong the length of time for which the paint is effective due to a low leaching rate without loss of the anti-fouling property. Especially, by using this copolymer, the anti-fouling paint can reduce environmental hazards due to reduction of the additional biocide like copper compounds.

BRIEF DESCRIPTION OF DRAWING

FIG. 1 is a schematic illustration of the apparatus for the erosion rate test on the paints of Examples, wherein numbers 1 to 8 denote drum 1, panel 2, shaft 3, electric motor 4, flowing sea water 5, vessel 6, inlet 7 and outlet 8, respectively.

DESCRIPTION OF INVENTION

We have found a new copolymer as binder which has excellent anti-fouling properties and a rate of hydrolysis suitable for use in self-polishing anti-fouling paints. According to one embodiment of the present invention, the anti-fouling paint for ship's hull comprises a film forming copolymer containing 1 to 30 percent by weight of n-[(N-isothiazolonyl)-alkyl] acrylate (A), 20 to 80 percent by weight of a triorganotin salt of olefinically unsaturated carboxylic acid (B), 15 to 60 percent by weight of at least one olefinically unsaturated comonomer (C) in its total monomer units. A maximum of 30 percent by weight of n-[(N-isothiazolonyl)-alkyl] acrylate (A) must be incorporated by copolymerization to control the dissolution rate of the copolymer. A minimum of 20 percent by weight of a triorganotin salt of olefinically unsaturated carboxylic acid (B) must be incorporated to achieve anti-fouling properties. The paint begins to deteriorate in 6 months below 20 percent.

The general structure of the copolymer is as shown below:

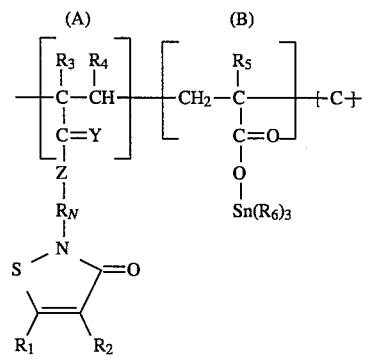

wherein $R_1$, $R_2$, $R_3$, $R_4$, Z, Y, and $R_N$ are as defined above; $R_5$ is H or methyl; $R_6$ is an alkyl group of $C_1$ to $C_{18}$, a cycloalkyl or phenyl group.

n-[(N-isothiazolonyl)-alkyl] acrylates (I) were synthesized by reactions of isothiazolone derivatives (II) with acrylic acid derivatives (III). Isothiazolone derivatives (II) were prepared from the starting materials, (IV) and (V).

The synthetic pathway is as shown in scheme I:

Scheme I

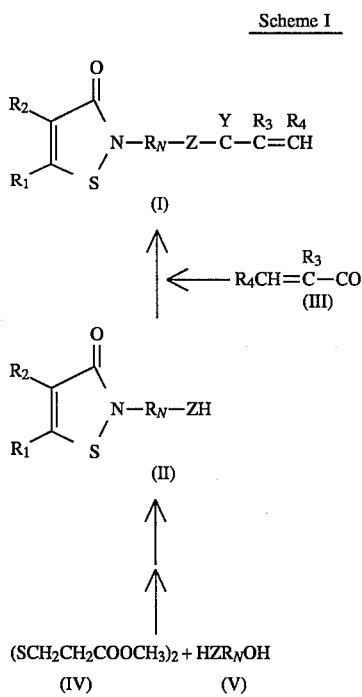

$(SCH_2CH_2COOCH_3)_2 + HZR_NOH$ (IV)        (V)

In a preferred embodiment of the invention, the monomer units (A) occupy 3 to 20 percent by weight of the total monomer units. The representative compounds of this type are 2-[(N-isothiazolonyl)ethyl] acrylate, 2-[(N-isothiazolonyl)ethyl]methacrylate, 4-[(N-4-chloroisothiazolonyl)butyl] acrylate, 2-[(N-4,5-dichloroisothiazolonyl)ethyl] acrylate, 6-[(N-5-chloroisothiazolonyl) hexyl]methacrylate, 2-[(N-4, 5-dichloroisothiazolonyl) ethyl] crotonate, [(N-4,5-dichloroisothiazolony) methyl] methacrylate, 2-[(N-isothiazolonyl)propyl] acrylate, 2'-[2-(N-4,5-dichloroisothiazolonyl) ethoxyethyl]acrylate, 2'-[2-(N-4,5-dichloroisothiazolonyl)ethoxyethyl] methacrylate, 3-[(N-isothiazolonyl)propyl] methacrylate, [(N-4,5-dichloroisothiazolonyl)methyl] acrylate, and 2-[(N-4,5-dichloroisothiazolonyl)ethyl] methacrylate.

Triorganotin compounds (B) preferably are at least 20 percent by weight of the monomer units. An alkyl methacrylate or alkyl acrylate unit having 1 to 6 carbons in the alkyl group is preferred. Typical triorganotin compounds suitable for use in this invention are tri-n-methyltin methacrylate, tri-n-butyltin methacrylate, tri-n-propyltin acrylate, tri-n-propyltin methacrylate, tri-phenyltin acrylate, and tri-phenyltin methacrylate. The olefinically unsaturated comonomers (C) are preferably selected from the group of esters of acrylic and methacrylic acid, for examples, methyl acrylate, methyl methacrylate, ethyl methacrylate, butyl acrylate, butyl methacrylate, isobutyl methacrylate, hexyl acrylate, etc. Vinyl monomers such as vinyl chloride, styrene, vinyl acetate, and vinyl butylate are also useful.

The copolymer can be prepared by various techniques of free radical polymerization, that is, bulk, solution or emulsion polymerization. The polymerization may be carried out with a suitable organic solvent such as xylene, toluene, n-butanol, benzene, naphtha, butyl acetate, hexane, etc., using a free radical initiator such as benzoyl peroxide, di-t-butyl peroxide, lauroyl peroxide, azobisisobutyronitrile, etc. Suitable temperatures for polymerization are in the range of 40° C. to 120° C. depending upon the catalyst system.

The anti-fouling paint composition may contain polymeric binders including vinyl and acrylic resins. They may also contain pigments such as zinc oxide, titanium oxide, etc.; thickners such as bentonite and aerosil; solvents such as toluene, xylene, benzene, hexane, butyl acetate, alcohol, etc.

PREPARATIVE EXAMPLE 1

Preparation of 2-[(N-isothiazolonyl)ethyl] acrylate

A solution of N,N'-diacetoxyethyl-3,3'-dithiodipropion amide (0.05 mole) in 100 ml of ethyl acetate was prepared in 250 ml, round-bottom flask equipped with a reflux condenser and overhead stirrer. After sulfuryl chloride (0.15 mole, 20.25 g) was added at 60° C., the reaction mixture was stirred for 3 hours. Then the product was hydrolyzed to get 2-( 2-hydroxyethyl)-3-isothiazolone. 2-( 2-hydroxyethyl)-3-isothiazolone was reacted with acrylic acid (0.3 mole) and hydroquinone(0.5 g) in 50 g of butyl acetate at 100° C. to 110° C. for 4 hours. The solution was cooled to room temperature, whereupon two phases were separated by water and ether. The aqueous phase was discarded, and the white crystals were recrystallized to yield 2-[(N-isothiazolonyl) ethyl] acrylate.

PREPARATIVE EXAMPLE 2

Preparation of 2-[(N-isothiazolonyl) ethyl] methacrylate

A solution of N,N'-diacetoxyethyl-3,3'-dithiodipropion amide (0.05 mole) in 100 ml of ethyl acetate was prepared in 250 ml, round-bottom flask equipped with a reflux condenser and overhead stirrer. After sulfuryl chloride (0.15 mole, 20.25 g) was added at 60° C., the reaction mixture was stirred for 3 hours. Then the product was hydrolyzed to get 2-(2-hydroxyethyl)-3-isothiazolone. 2-(2-hydroxyethyl)-3-isothiazolone was reacted with methacrylic acid (0.3 mole) and hydroquinone (0.5 g) in 50 g of butyl acetate at 100° C. to 110° C. for 4 hours. The solution was cooled to room temperature, whereupon two phases were separated by water and ether. The aqueous phase was discarded, and the white crystals were recrystallized to yield 2-[(N-isothiazolonyl) ethyl] methacrylate.

PREPARATIVE EXAMPLE 3

Preparation of 4-[(N-4-chloroisothiazolonyl) butyl acrylate

A solution of N,N'-diacetoxybutyl-3,3'-dithiodipropion amide (0.05 mole) in 100 ml of ethyl acetate was prepared in 250 ml, round-bottom flask equipped with a reflux condenser and overhead stirrer. After sulfuryl chloride (0.25 mole, 33.75 g) was added at 60° C., the reaction mixture was stirred for 3 hours. Then the product was hydrolyzed to get 4-chloro-2-(2-hydroxybutyl)-3-isothiazolone. 4-chloro-2-(2-hydroxybuthyl)-3-isothiazolone was reacted with acrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded and the white crystals were recrystallized to yield 4-[(N-4-chloroisothiazolonyl) butyl] acrylate.

PREPARATIVE EXAMPLE 4

Preparation of 2-[(N,-4,5-dicholoroisothiazolonyl)ethyl]acrylate

A solution of N,N'-diacetoxyethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-[2-hydroxyethyl]-3-isothiazolone. 4,5-dichloro- 2-[2-hydroxyethyl]-3-isothiazolone was reacted with acrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 2-[(N-4,5-dichloroisothiazolony)ethyl]acrylate.

PREPARATIVE EXAMPLE 5

Preparation of 6-[(N-5-chloroisothiazolonyl)hexyl] methacrylate

A solution of N,N'-diacetoxyhexyl-3,3'-dithiodipropion amide (0.05 mole) in 50 ml of butyl acetate was prepared in 250 ml, round-bottom flask equipped with a reflux condenser and overhead stirrer. After sulfuryl chloride (0.25 mole, 33.75 g) was added at 60° C., the reaction mixture was stirred for 3 hours. Then the product was hydrolyzed to get 5-chloro-2-[2-hydroxyhexyl]-3-isothiazolone. 5-chloro-2-[2-hydroxyethyl]-3-isothiazolone was reacted with methacrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 6-[(N-5-chloroisothiazolonyl) hexyl] methacrylate.

PREPARATIVE EXAMPLE 6

Preparation of 2-[(N-4,5-dichloroisothiazolonyl) ethyl] crotonate

A solution of N,N'-diacetoxyethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-[2-hydroxyethyl]-3-isothiazolone. 4,5-dichloro-2-[2-hydroxyethyl]-3-isothiazolone was reacted with crotonic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 2-[(N-4,5-dichloroisothiazolonyl)ethyl] crotonate.

PREPARATIVE EXAMPLE 7

Preparation of [(N-4,5-dichloroisothiazolonyl)methyl] methacrylate

A solution of N,N'-diacetoxymethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-hydroxymethyl-3-isothiazolone. 4,5-dichloro- 2-hydroxymethyl-3-isothiazolone was reacted with methacrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield [(N-4,5-dichloroisothiazolonyl)methyl] methacrylate.

PREPARATIVE EXAMPLE 8

Preparation of 2-[(N-isothiazolonyl) propyl] acrylate

A solution of N,N'-diacetoxypropyl-3,3'-dithiodipropion amide (0.05 mole) in 50 ml of butyl acetate was prepared in 250 ml, round-bottom flask equipped with a reflux condenser and overhead stirrer. After sulfuryl chloride (0.15 mole, 20.25 g) was added at 60° C., the reaction mixture was stirred for 3 hours. Then the product was hydrolyzed to get 2-[2-hydroxypropyl]-3-isothiazolone. 2-[2-hydroxypropyl]-3-isothiazolone was reacted with acrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 2-[(N-isothiazolonyl) propyl] acrylate.

PREPARATIVE EXAMPLE 9

Preparation of 2'-[2-(N-4,5-dichloroisothiazolonyl) ethoxyethyl] acrylate

A solution of N,N'-diacetoxyethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-[2-hydroxyethyl]-3-isothiazolone. 4,5-dichloro-2-[2-hydroxyethyl]-3-isothiazolone was reacted with 2-hydroxyethylacrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 2'-[2-(N-4,5-dichloroisothiazolonyl) ethoxyethyl] acrylate.

PREPARATIVE EXAMPLE 10

Preparation of 2'-[2-(N-4,5-dichloroisothiazolonyl ethoxyethyl] methacrylate

A solution of N,N'-diacetoxyethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-[2-hydroxyethyl]-3-isothiazolone. 4,5-dichloro-2-[2-hydroxyethyl]-3-isothiazolone was reacted with 2-hydroxyethylmethacrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 2'-[2-(N-4,5-dichloroisothiazolonyl) ethoxyethyl] methacrylate.

PREPARATIVE EXAMPLE 11

Preparation of 3-[(N-isothiazolonyl) propyl] methacrylate

A solution of N,N'-diacetoxypropyl-3,3'-dithiodipropion_amide (0.05 mole) in 50 ml of butyl acetate was prepared in 250 ml, round-bottom flask equipped with a reflux condenser and overhead stirrer. After sulfuryl chloride (0.15 mole, 20.25 g) was added at 60° C., the reaction mixture was stirred for 3 hours. Then the product was hydrolyzed to get 2-[3-hydroxypropyl]-3-isothiazolone. 2-[3-hydroxypropyl] -3-isothiazolone was reacted with methacrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield 3-[(N-isothiazolonyl) propyl] methacrylate.

PREPARATIVE EXAMPLE 12

Preparation of [(N-4,5-dichloroisothiazolonyl)methyl] acrylate

A solution of N,N'-diacetoxymethyl-3,3'-dithiodipropion amide (0.05 mole) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-hydroxymethyl-3-isothiazolone. 4,5-dichloro- 2-hydroxymethyl-3-isothiazolone was reacted with acrylic acid (0.3 mole) and hydroquinone (0.5 g) in 50 g of butyl acetate at 100° C. to 110° C. for 5 hours. The solution was cooled to room temperature, whereupon two phases were separated by water and ether. The aqueous phase was discarded, and the white crystals were recrystallized to yield [(N-4,5-dichloroisothiazolonyl) methyl] acrylate.

PREPARATIVE EXAMPLE 13

Preparation of 2-[(N-4,5-dichloroisothiazolonyl)ethyl] methacrylate

A solution of N,N'-diacetoxyethyl-3,3'-dithiodipropion amide (0.05 mole, 19.3 g) in 50 ml of butyl acetate was prepared in 250 ml, round-bottom flask equipped with a reflux condenser and overhead stirrer. After sulfuryl chloride (0.35 mole, 47.25 g) was added at 60° C., the reaction mixture was stirred for 3 hours. Then the product was hydrolyzed to get 4,5-dichloro-2-(2-hydroxyethyl)-3-isothiazolone. 4,5-dichloro-2-(2-hydroxyethyl)-3-isothiazolone was reacted with excess methacrylic acid and hydroquinone (0.5 g) in 50 g of butyl acetate at 100° C. to 110° C. for 5 hours. The solution was cooled to room temperature whereupon two phases were separated by water and ether. The aqueous phase was discarded and the white crystals were recrystallized to yield 2-[(N-4,5-dichloroisothiazolonyl)ethyl] methacrylate.

Inhibition Zone Test

The effectiveness of n-[(N-isothiazolonyl)-alkyl] acrylates containing an, β-unsaturated heterocyclic group (from Preparative Examples 1 to 13) as biocide was proved by an inhibition zone test in our laboratory. The test was performed by fungi and algae grown under a condition of RH 65% to 75% at 26° C. to 28° C. The results are listed in Table I and compared with tributyltin oxide (TBTO). This result shows that n-[(N-isothiazolonyl)-alkyl] acrylates have excellent properties as as biocide.

TABLE I

| Preparative Example | Fungistic Evaluation | | Algaestic Evaluation (mm) | |
|---|---|---|---|---|
| | A niger | Rhiz. (Rhodo) | Chlolella | Oscilatoria |
| 1 | 8.1 | 8.3 | 7.5 | 7.0 |
| 2 | 8.0 | 7.7 | 8.0 | 7.5 |
| 3 | 7.0 | 7.5 | 6.0 | 6.5 |
| 4 | 7.6 | 7.9 | 4.0 | 4.3 |
| 5 | 7.3 | 7.4 | 6.0 | 6.5 |
| 6 | 6.9 | 6.8 | 6.2 | 6.4 |
| 7 | 7.1 | 7.2 | 6.8 | 6.9 |
| 8 | 8.5 | 8.4 | 9.5 | 8.5 |
| 9 | 6.7 | 6.8 | 4.5 | 5.0 |
| 10 | 7.7 | 7.3 | 7.2 | 4.5 |
| 11 | 8.1 | 8.4 | 6.8 | 6.3 |
| 12 | 6.5 | 7.0 | 4.5 | 4.7 |
| 13 | 7.0 | 7.2 | 5.0 | 5.5 |
| TBTO | 4.7 | 5.2 | 3.0 | 3.0 |

PREPARATIVE EXAMPLE 14

Preparation of Copolymers

Various copolymers (sample Nos. C1 to C6) were made as shown in Table II below. Copolymers, C1 and C2, were made without n-[(N-isothiazolonyl)-alkyl] acrylate as controls. The rest of copolymers contained 10 percent by weight of n-[(N-isothiazolonyl) alkyl] acrylate in the total monomer units to compare with controls.

Tri-n-butyltin methacrylate monomer (TBTM) was prepared through esterification of methacrylic acid with tributyltin oxide (TBTO) in benzene or toluene. The temperature was not allowed to rise above 25° C. when the solution became clear, heating at 30° C. was continued for one more hour, and all benzene or toluene was evacuated. The resulting pale yellow viscous liquid was then diluted with 100 ml of petroleum ether and cooled to −20° C. The product was separated as long, thick, transparent crystals, having an m.p. of 18° C.

TABLE II

| Preparation of copolymers | | | | | | |
|---|---|---|---|---|---|---|
| | Copolymer No. | | | | | |
| | C1 | C2 | C3 | C4 | C5 | C6 |
| Monomer | | | | | | |
| M1 (g) | | | 10 | | | |
| M2 (g) | | | | 10 | | |
| M3 (g) | | | | | 10 | |
| M4 (g) | | | | | | 10 |
| TBTM (g) | 70 | 70 | 60 | 60 | 60 | 60 |
| MMA (g) | 30 | 20 | 20 | 20 | 20 | 20 |
| BMA (g) | | 10 | 10 | 10 | 10 | 10 |

TABLE II-continued

Preparation of copolymers

| | Copolymer No. | | | | |
|---|---|---|---|---|---|
| C1 | C2 | C3 | C4 | C5 | C6 |

M1: 2-[(N-isothiazolonyl) ethyl] acrylate
M2: 2-[(N-4,5-dichloroisothiazolonyl) ethyl] acrylate
M3: 2-[(N-4,5-dichloroisothiazolonyl) ethyl] crotonate
M4: 2-[(N-4,5-dichloroisothiazolonyl) ethyl] methacrylate
TBTM: Tri-n-butyltin methacrylate monomer
MMA: Methyl methacrylate
BMA: n-butyl methacrylate

EXAMPLES 1 to 8

Examples with various paint formulations are stated in Table III. The compositions indicated in Table III are expressed in terms of percent by weight of used materials.

Copolymer and pigments were premixed in solvent with high speed dissolver. The resultant mill base was dispersed with the Red-Devil mixer. After dispersing, cuprous oxide was added to the mill base and dispersed with high speed dissolver. The well-mixed paint was checked for a desired fitness of grind.

TABLE III

Paint Compositions (percent by weight)

| | Cont. 1 | Cont. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Co-polymer | C1 | C2 | C3 | C4 | C5 | C6 | C3 | C4 | C5 | C6 |
| | 23 | 23 | 23 | 23 | 23 | 23 | 23 | 23 | 23 | 23 |
| Cu2O | 40 | 40 | 40 | 40 | 40 | 40 | 30 | 30 | 30 | 30 |
| ZnO | 6 | 6 | 6 | 6 | 6 | 6 | 6 | 6 | 6 | 6 |
| IOR | 7 | 7 | 7 | 7 | 7 | 7 | 7 | 7 | 7 | 7 |
| xylene | 21 | 21 | 21 | 21 | 21 | 21 | 21 | 21 | 21 | 21 |
| MIBK | 3 | 3 | 3 | 3 | 3 | 3 | 3 | 3 | 3 | 3 |

IOR: Iron oxide red
MIBK: Methyl isobutyl ketone

Evaluation of A/F Paints

Method

A) Erosion rate determination

The paints have been sprayed onto test panels previously coated with tar urethane primer and vinyl sealer. Thickness of the anti-fouling paints was 150 μm. The panels were tested in an apparatus schematically illustrated in FIG. 1. The motor 4 rotates with a speed of 17 knots at 25° C. in sea water 5. After a conditioning period of 8 days, the erosion rate of the tin compound was determined bi-weekly by measuring the thickness of the paints.

B) Rafting test

Test panels were cut in a 300×150×3 mm size. The panels were hung on suitable racks and were submerged in the local water using float rafts for 6, 12 and 24 months, respectively.

Fouling Rating (FR)—Fouling was rated as follows;
0=no fouling
+=very slight fouling
++=slight fouling
+++=moderate fouling
++++=heavy fouling Results Table IV summarizes the results of the erosion rate and fouling rate tests.

The erosion rates of the paints which used copolymers containing 10 percent by weight of n-[(N-isothiazolonyl)-alkyl] acrylates in the total monomer units (Examples 1 to 8) were lower than those of control, and the anti-fouling property of the paints was more effective, as shown in Table IV.

TABLE IV

Erosion Rate and Fouling Rate

| Example No. | Erosion rate (μm/cm²/day) | Fouling Rating | | |
|---|---|---|---|---|
| | | 6 mons. | 12 mons. | 24 mons. |
| Control 1 | 0.31 | + | ++ | ++ |
| Control 2 | 0.20 | + | ++ | ++ |
| Example 1 | 0.16 | 0 | 0 | + |
| Example 2 | 0.15 | 0 | + | + |
| Example 3 | 0.17 | 0 | 0 | + |
| Example 4 | 0.16 | 0 | 0 | + |
| Example 5 | 0.10 | 0 | + | ++ |
| Example 6 | 0.10 | 0 | + | ++ |
| Example 7 | 0.09 | 0 | + | ++ |
| Example 8 | 0.11 | 0 | + | ++ |

These results show that the biologically active anti-fouling copolymer containing n-[(N-isothiazolonyl)-alkyl] acrylates are useful for anti-fouling paints.

What is claimed is:

1. An anti-fouling paint comprising self-polishing copolymer which contains n-[(N-isothiazolonyl)-alkyl] acrylate of formula I as one of the monomers:

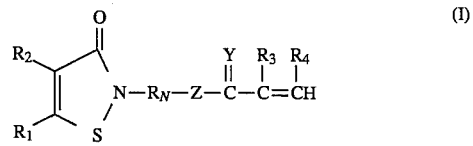

wherein $R_1$ and $R_2$ are independently H, halogen, alkyl group of $C_1$ to $C_5$, or an alkyl group of $C_1$ to $C_5$ substituted by halogen;

$R_N$ is substituted or unsubstituted alkyl, or an alkenyl group of $C_1$ to $C_{18}$;

Z is NH, O or S;

Y is O or S;

$R_3$ and $R_4$ are independently H, halogen, alkyl group of $C_1$ to $C_5$ or alkyl group of $C_1$ to $C_5$ substituted by halogen.

2. An anti-fouling paint according to claim 1, wherein the copolymer contains 1 to 30 percent by weight of n-[(N-isothiazolonyl)alkyl] acrylate in its total monomer units.

3. An anti-fouling paint according to claim 1, wherein the copolymer contains 20 to 80 percent by weight of a triorganotin salt of a olefinically unsaturated carboxylic acid in its total monomer units.

4. An anti-fouling paint according to claim 1, wherein the copolymer contains 15 to 60 percent by weight of at least one olefinically unsaturated comonomer in its total monomer units.

5. An anti-fouling paint according to claim 1, further comprising at least one metalliferous pigment selected from a group of zinc oxide, cuprous oxide, and a mixture thereof.

* * * * *